United States Patent
Chen et al.

(10) Patent No.: US 7,854,011 B2
(45) Date of Patent: Dec. 14, 2010

(54) METHOD OF MANAGING DIGITAL RIGHTS

(75) Inventors: Liangshen Chen, Cupertino, CA (US);
Xiaojing Zheng, Santa Clara, CA (US);
Fan Du, Campbell, CA (US); Chen Hu,
Sunnyvale, CA (US)

(73) Assignee: Green Packet, Inc., Cupertino, CA (US)

( * ) Notice: Subject to any disclaimer, the term of this patent is extended or adjusted under 35 U.S.C. 154(b) by 699 days.

(21) Appl. No.: 10/584,764

(22) PCT Filed: Jan. 3, 2005

(86) PCT No.: PCT/US2005/000079

§ 371 (c)(1),
(2), (4) Date: May 10, 2007

(87) PCT Pub. No.: WO2005/065434

PCT Pub. Date: Jul. 21, 2005

(65) Prior Publication Data

US 2008/0028471 A1    Jan. 31, 2008

Related U.S. Application Data

(60) Provisional application No. 60/481,844, filed on Dec. 31, 2003.

(51) Int. Cl.
*G06F 7/04* (2006.01)
*G06F 17/30* (2006.01)
*H04N 7/16* (2006.01)

(52) U.S. Cl. .............. 726/27; 726/26; 726/28; 726/29; 726/30; 713/187; 705/57; 380/201; 380/202; 380/203; 380/204; 700/225; 700/226; 700/227

(58) Field of Classification Search .............. 726/26–30
See application file for complete search history.

(56) References Cited

U.S. PATENT DOCUMENTS

| | | | |
|---|---|---|---|
| 6,061,794 A | 5/2000 | Angelo et al. | |
| 6,170,744 B1 | 1/2001 | Lee et al. | |
| 6,408,330 B1 | 6/2002 | DeLaHuerga | |
| 6,550,012 B1 | 4/2003 | Villa et al. | |
| 7,322,042 B2* | 1/2008 | Srinivasan et al. | 726/17 |
| 7,461,249 B1* | 12/2008 | Pearson et al. | 713/156 |
| 2002/0085722 A1* | 7/2002 | Asano et al. | 380/278 |
| 2002/0166063 A1 | 11/2002 | Lachman, III et al. | |
| 2003/0078891 A1* | 4/2003 | Capitant | 705/57 |
| 2003/0177098 A1* | 9/2003 | Oshima et al. | 705/51 |
| 2004/0103011 A1* | 5/2004 | Hatano et al. | 705/4 |
| 2004/0235521 A1* | 11/2004 | Pradhan et al. | 455/558 |

* cited by examiner

*Primary Examiner*—Taghi T Arani
*Assistant Examiner*—Mahfuzur Rahman
(74) *Attorney, Agent, or Firm*—Young & Thompson

(57) ABSTRACT

A method of managing digital rights in a network without a central license server where each instance of the program broadcasts its identification into the network, and any instance of the program detecting its own license code from another node closes down. A closing program may also generate a close down message to the conflicting program.

7 Claims, 3 Drawing Sheets

METHOD OF MANAGING DIGITAL RIGHTS

TECHNICAL FIELD

The invention generally relates to controlling the use of licensed digital media on a network such as programs, artistic, literary or musical works on a network.

More particularly the invention relates to controlling the licensing of programs, software or multimedia items where there is no central repository registering the copies in use and restricting the license use on the basis of the central records.

BACKGROUND ART

Programs are normally associated with licenses, typically in the form of a license number or key, the intention being that the program cannot run without a license number which is entered by a user at installation of the program. Similarly multimedia discs or similar items may include a license number to distinguish the individual copy, which is intended to be played by only one person.

The intention is to control the number of unauthorized copies of the program or multimedia disk or file in use; however such a system does not prevent repeated installations of the program with the same license number or of copies of the same multimedia disc or file on different computers.

Methods of controlling the installation of unauthorized copies of the licenses of programs on computers or similar items such as routers and switches are known. These normally operate by detecting the initialization of computers on a network and validating the use of a license on that computer against a central list of licenses.

Such a system will not work where there is no central server monitoring or dispensing the licenses, for instance in an ad-hoc wireless network.

The present invention provides a solution to this and other problems which offers advantages over the prior art or which will at least provide the public with a useful choice.

SUMMARY OF THE INVENTION

The invention in one exemplification lies in a method of managing the rights to access or run digital media such as a program containing a user agent in a network environment comprising:

at initialization detecting network data packets containing license number information of other such programs running on the network and:

when the detected license number is identical to that being initialized preventing initialization continuing, or when the detected license number is not identical to that being initialized allowing program initialization and then broadcasting the license number into the network in a data packet.

Preferably the program once initialized replicates onwards packets from other instances of the program running elsewhere on the network.

Preferably when a packet containing a license number identical to that being initialized is received, broadcasting to the network a packet with a "halt" command, receiving the halt command in the computer with the duplicate program running, and causing the program to terminate.

Preferably the user agent may be embedded in multimedia discs or files.

In a further exemplification the invention relates to a method of generating a license number for a program consisting of:

generating a unique license code generating from the license code a verification code and concatenating this to the license code encrypting the concatenated code and dispersing it with the program.

A method as claimed in claim 4 consisting of generating a user code from the encrypted code.

A computer when running a user agent of a program, which user agent on initialization recognizes other instances of the program on the network, a comparator which compares the license code of other instances of the program on the network with the license code of the initializing version, an initialization invocation which initializes the program and broadcasts the program license code if the license code is not found and a detector which detects a positive comparison and prevents initialization of the program when an identical license code is found.

Preferably the comparator may also detect a "halt" instruction from an initialization invocation on a computer which is using an identical license number.

Preferably on detection by the detector of a positive comparison, a network interface broadcasts a "halt" indication to the originating user agent.

Preferably the user agent may be embedded in a multimedia file or disc.

These and other features of as well as advantages which characterize the present invention will be apparent upon reading of the following detailed description and review of the associated drawings.

DESCRIPTION OF THE INVENTION

The inventive method provides a user agent for a particular item of licensed software or a multimedia file or disc, which agent appears on every computer using the software or playing the multimedia item. The agent would normally be placed during the installation of the software itself or at initialization of the playing of the multimedia disc. The agent continuously broadcasts or multi-casts data packets if the computer is connected to a network, whether that network is wired or wireless. The data packets contain an identifier for the license of that software.

A computer attempting to initialize the software while the computer is connected to the network will monitor the network packets for those generated by the same agent on other computers, and extract the license identifier from those packets. A comparison will show if the identifier is the same as that on the initializing computer then the agent will decline to initialize the software, since this indicates a duplicate installation of licenses.

The data packets which are broadcast are created with a typical TTL (time to live) and hence will not progress far if the network is large, however each of the agents may rebroadcast all packets for that software so that the effective network radius for a license is increased. As is typical with data packets each packet carries an identification number and packets which have already been sent will not be resent.

The license codes for the software are preferably originally generated by creating a unique code as an initial license code, this code being recorded in a database and compared with all previous numbers to ensure that it is in fact unique. The code is then hashed or otherwise convolved to create a second code which is dependent on the first. The two codes are then concatenated and padded or truncated to a length suitable for encryption. Once encrypted the resulting code can be used as an identifying code for one instance of the software. A further reversible convolution of the resulting code can be used to create an ASCII user readable code which can be used as the user enterable license key during software installation.

At any time the code can be verified by decryption, splitting into the hashed portion and the identification portion and then recreation of the hashed code from the identification portion and comparison with the received hash portion.

Figure 1:
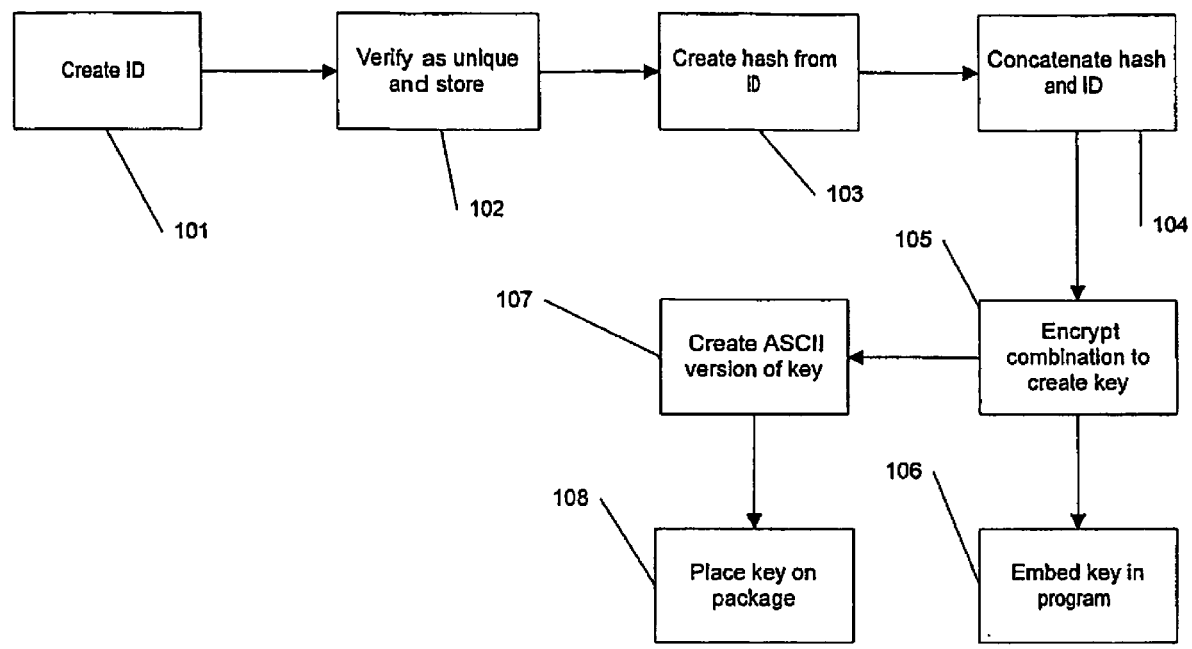
FIG. 1 is a flow diagram of a method of creating a unique program identification key.

FIG. 1 shows at 101 the creation of an ID, typically by a pseudo-random number generator (though note that the generator will generate hex codes rather than simple numbers). At 102 the code number is compared with those already in a database, and if unique the number is stored. At 104 a hash or similar code for verifying the stored number is created and concatenated to the code.

The combined hash and code is then encrypted at 105 and the result is the key for a program which may be embedded within the program or permanently attached in some other manner at 106. A user-understandable version of the key is created at 107 and this version may be placed on the program packaging or included with the program so that it may be used during the initial installation of the program on a computer.

Figure 2:
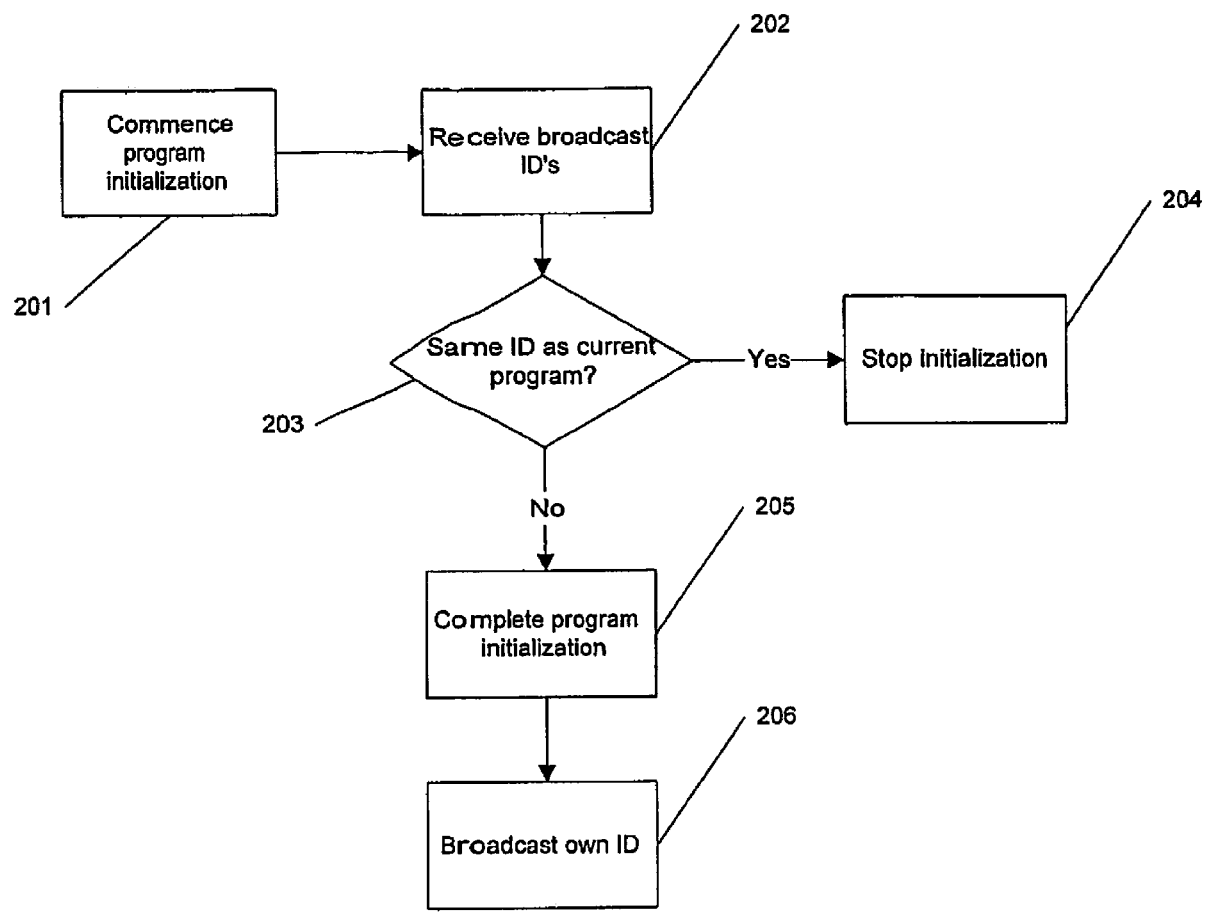
FIG. 2 is a block diagram of a method of verifying that a computer has a valid program license.

FIG. 2 shows the process during each initialization of the program on the user's computer. An agent installed at program installation is first invoked at 201 and reads all incoming data packets (UDP or TCP) on the network input at 202 looking for packets carrying content identifying themselves as broadcast packets carrying the ID of a program of the required type. When such a packet is detected at 203 it is examined to determine whether the ID is the same as that of the program which is seeking to initialize. If so control is passed at 204 to an error output which indicates that the program is already installed on the network and closes the initialization routine down. Before doing this, however, a packet may be propagated into the network with the target being the other computer running the same license number and the content being a "halt" message. When the agent of the other computer detects a "halt" message for its own license number it will shut down that instance of the program.

If the ID is not detected in the relevant packages the program initialization is completed at 205 and the identifying agent then broadcasts the program ID into the network to prevent any other computer from initializing the same license instance.

Where the license is associated with a multimedia disc or file the user agent is invoked by attempting to play the disc or file.

Figure 3:
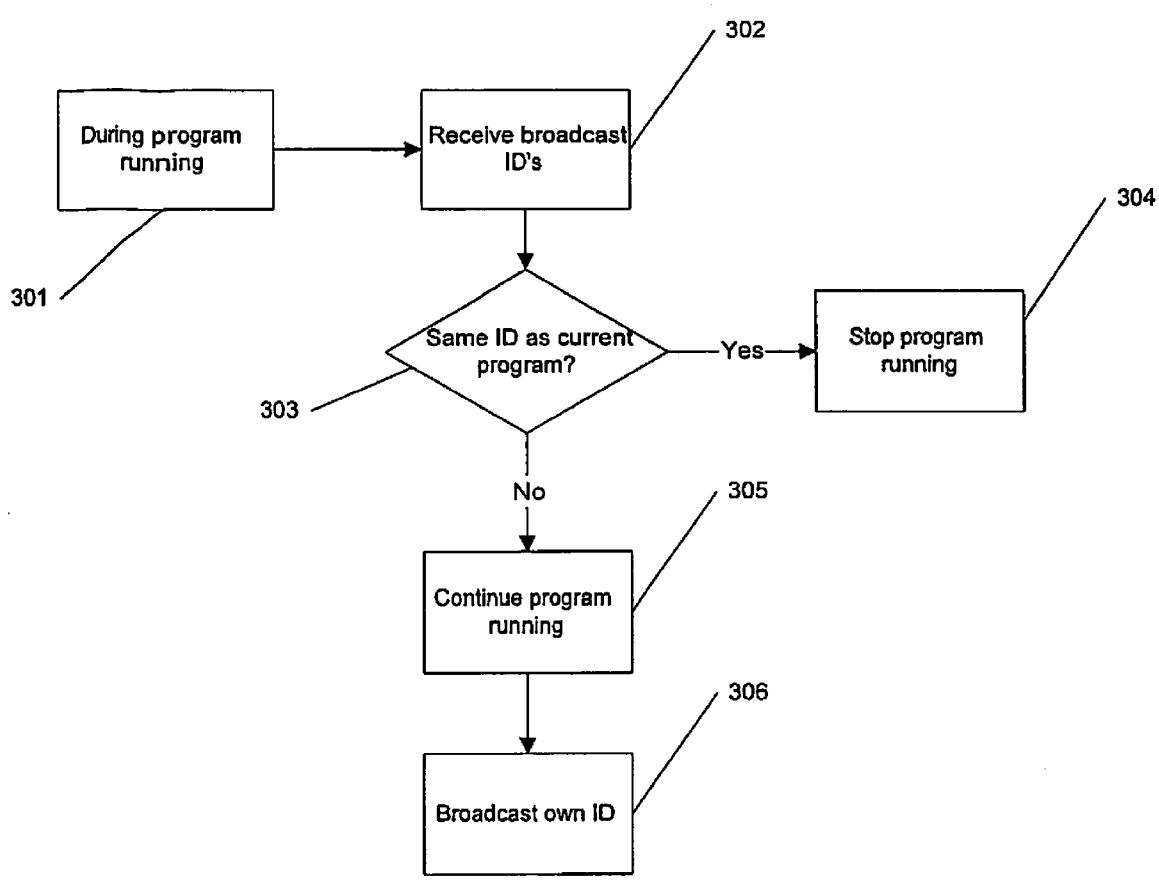
FIG. 3 is a block diagram of a method of verifying that a computer continues to retain a valid program license.

FIG. 3 shows how the program, once instantiated, checks periodically for the use of its license number on the network. While the program is run, as at 301, a periodic check at 302 is made by detecting at 303 whether the same license is embedded in an identification packet present on the network. If an identical license ID is found the program is stopped at 304, otherwise it continues as at 305, and additionally broadcasts its own license ID into the network.

The agent may regenerate the data packet completely and pass it back in to the network, or it may, as is usual, recreate it with the TTL reduced by one, thus limiting the extent to which the packet will propagate through the network. While it is desirable to detect all instances of a program on a network and prevent any use of a duplicate copy it may not be practical to replicate the packets forever over the network in the interests of reducing network traffic.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular implementation of the data packet with contained key may vary dependent on the particular application for which it is used without variation in the spirit and scope of the present invention.

In addition, although the preferred embodiments described herein are directed to packets for use in a TCP or UDP packet system, it will be appreciated by those skilled in the art that the teachings of the present invention can be applied to other systems such as NETBEUI, without departing from the scope and spirit of the present invention.

INDUSTRIAL APPLICABILITY

The digital media license control of the invention is usable in networks of any type to limit the use of replicated copies of digital media such as a program or to otherwise indicate the ability of a user to validly run a program or access other examples of digital media. The present invention is therefore industrially applicable.

Although the examples have been described with reference to programs, the invention is applicable to any form of digital media where license control is required, including literary, artistic, musical works as well as various programs, databases and other works in which intellectual property may reside.

What is claimed is:

1. A method of managing the rights to digital media, comprising:
   acting in a network environment, wherein the network environment includes a plurality of computers and one or more items of digital media loadable onto one or more of the computers,
   each item of digital media having (a) an allocated license number and (b) a user agent associated with the item of digital media,
   each user agent programmed to (i) initialize and control the loading of the digital media, (ii) control the operation of the item of digital media, (iii) broadcast network data packets containing the allocated license number information of the digital media loaded by that user agent to the network environment, and (iv) detect network data packets containing license number information of other digital media broadcast by other user agents in others of said computers on the network environment, wherein,
   at initialization of the digital media having an allocated license number and installed with the user agent on one of said computers, the user agent detects other network data packets and then looks for the license number information of the other digital media broadcast by other user agents in others of said computers on the network environment, and when the detected license number is identical to the license number of the digital media being initialized by the user agent, the user agent (a) preventing initialization of the digital media continuing on that computer, and (b) broadcasting to the network environment a packet with the target being another computer running a user agent associated with the same digital media license number and with content of the broadcast network packet containing a "halt" command, receiving the "halt" command in the other computer which had broadcast the same license number, and causing the other computer to shut down the associated digital media instance, and at the initialization of the digital media having the allocated license number and installed with the user agent on one of said computers, the user agent i) detects no packets or detects a packet and the detected license number associated therewith is not identical to the license number of the digital media being initialized by the user agent, allowing digital media initialization by the user agent and broadcasting the license number into the network in a data packet.

2. A method as claimed in claim 1 wherein the digital media once initialized replicates onwards packets from other instances of the digital media accessed or running elsewhere on the network.

3. A method as claimed in claim 1 wherein the digital media is a program running on the network.

4. A method of generating a license number for digital media as claimed in claim 1 comprising the further steps of:
- generating a unique license code;
- generating from the license code a verification code and concatenating this to the license code; and
- encrypting the concatenated code and dispersing the concatenated code with the digital media.

5. A method as claimed in claim 4 further comprising the step of generating a user code from the encrypted code.

6. A method as claimed in claim 1 wherein the user agent is embedded in a multimedia file or disc.

7. The method of claim 1, wherein, the license number of the digital media comprises a license code and a verification code.

* * * * *